US012636820B2

(12) United States Patent
Iwanari et al.

(10) Patent No.: US 12,636,820 B2
(45) Date of Patent: May 26, 2026

(54) METHOD FOR MANUFACTURING FOAM MOLDED BODY

(71) Applicant: Archem Inc., Tokyo (JP)

(72) Inventors: Taiga Iwanari, Tokyo (JP); Yuuichirou Kondou, Tokyo (JP); Norihito Ibi, Tokyo (JP)

(73) Assignee: Archem Inc., Tokyo (JP)

( * ) Notice: Subject to any disclaimer, the term of this patent is extended or adjusted under 35 U.S.C. 154(b) by 40 days.

(21) Appl. No.: 18/845,985

(22) PCT Filed: Mar. 3, 2023

(86) PCT No.: PCT/JP2023/008181
§ 371 (c)(1),
(2) Date: Sep. 11, 2024

(87) PCT Pub. No.: WO2023/189221
PCT Pub. Date: Oct. 5, 2023

(65) Prior Publication Data
US 2025/0196410 A1     Jun. 19, 2025

(30) Foreign Application Priority Data
Mar. 29, 2022     (JP) ................................. 2022-054643

(51) Int. Cl.
*B29C 44/00*          (2006.01)
*B29C 44/12*          (2006.01)
*B29C 44/34*          (2006.01)
(52) U.S. Cl.
CPC .......... *B29C 44/3446* (2013.01); *B29C 44/12* (2013.01)

(58) Field of Classification Search
None
See application file for complete search history.

(56) References Cited

U.S. PATENT DOCUMENTS

| | | | |
|---|---|---|---|
| 9,463,586 B2 | 10/2016 | Igarashi | |
| 2010/0187710 A1 | 7/2010 | Tanaka et al. | |
| 2023/0062429 A1* | 3/2023 | Chen ...................... | B29C 44/08 |

FOREIGN PATENT DOCUMENTS

| | | |
|---|---|---|
| JP | 2003200441 A | 7/2003 |
| JP | 2006069079 A | 3/2006 |

(Continued)

OTHER PUBLICATIONS

Sep. 24, 2024, International Preliminary Report on Patentability issued in the International Patent Application No. PCT/JP2023/008181.

(Continued)

*Primary Examiner* — Armand Melendez
(74) *Attorney, Agent, or Firm* — KENJA IP LAW PC

(57)     ABSTRACT
A method for manufacturing a foam molded body according to the present disclosure is a method for manufacturing a foam molded body to obtain a foam molded body in which a portion of an embedded member is exposed from a foam body by use of a mold (1). An embedded member (12) is placed in a cavity (S1) of the mold (1), a foam raw material in the cavity (S1) is foamed, and a gas is injected toward a portion (12a) of the embedded member (12). The injection pressure of the gas is a pressure that is equivalent to the foaming pressure of the foam raw material, and the injecting of the gas is started at the point in time when the foam raw material starts to react and is continued at least until the rise time of the foam raw material elapses.

1 Claim, 4 Drawing Sheets

(56) References Cited

FOREIGN PATENT DOCUMENTS

| JP | 2010208338 | A | | 9/2010 | | |
| JP | 2011037280 | A | | 2/2011 | | |
| JP | 5663315 | B2 | | 2/2015 | | |
| KR | 20200025729 | A | * | 3/2020 | ........... | B60N 2/5642 |
| WO | 2019107148 | A1 | | 6/2019 | | |

OTHER PUBLICATIONS

May 30, 2023, International Search Report issued in the International Patent Application No. PCT/JP2023/008181.

* cited by examiner

Front Back

Down

METHOD FOR MANUFACTURING FOAM MOLDED BODY

TECHNICAL FIELD

The present disclosure relates to a method for manufacturing a foam molded body. The present application claims priority to Japanese Patent Application No. 2022-054643 filed on Mar. 29, 2022, the entire contents of which are incorporated herein by reference.

BACKGROUND

As a conventional foam molded body, a foam molded body in which a frame material for fixing to a seat frame of a vehicle protrudes from the foam body, for example, is known (see, for example, Patent Literature (PTL) 1). If no measures are taken for such a foam molded body, then during mold forming using a die, excess matter is generated around the frame material that should protrude from the foam body. For this reason, conventional methods for manufacturing foam molded bodies, such as the manufacturing method described in PTL 1, for example, provide a removable clearance member (insert), such as a pivoting mold, in the cavity of the die to form a clearance in advance, before the foam raw material is supplied, around the frame material that should protrude from the foam body.

CITATION LIST

Patent Literature

PTL 1: JP 5663315 B2

SUMMARY

Technical Problem

However, the aforementioned conventional manufacturing method requires manual work by an operator, since the clearance member is placed inside the mold (die), which also increases the number of man-hours. Placement of a clearance member inside the mold also entails the risk that when the foam raw material flows between the mold and the clearance member, the foam body may be formed in a different shape than intended. In addition, when a rotating mold is used as a clearance member, as described in PTL 1, foam penetrates into and adheres to the rotation mechanism of the rotating mold, making periodic maintenance necessary.

It is an aim of the present disclosure to provide a method for manufacturing a foam molded body in order to easily obtain a foam molded body in which a portion of an embedded member is exposed from the foam body.

Solution to Problem

A method for manufacturing a foam molded body according to the present disclosure is a method for manufacturing a foam molded body to obtain a foam molded body in which a portion of an embedded member is exposed from a foam body by use of a mold, the method including a foam raw material foaming process of placing the embedded member in a cavity formed inside the mold so that the portion of the embedded member is at a higher position than a bottom surface of the cavity and foaming a foam raw material in the cavity, and a gas injection process of injecting a gas toward the portion of the embedded member in the cavity, wherein an injection pressure of the gas is a pressure that is equivalent to a foaming pressure of the foam raw material, and the injecting of the gas is started at a point in time when the foam raw material starts to react and is continued at least until a rise time of the foam raw material elapses. The method for manufacturing a foam molded body according to the present disclosure can easily obtain a foam molded body in which a portion of an embedded member is exposed from a foam body.

In the method for manufacturing a foam molded body according to the present disclosure, the gas is preferably injected for an injection time adjusted according to a height between the portion of the embedded member and the bottom surface of the cavity, and in a case in which two or more foam molded bodies with different exposed dimensions of the embedded member are to be manufactured, the injection time of the gas is preferably longer for the foam molded body for which the height is higher than for the foam molded body for which the height is lower. In this case, foam molded bodies with different exposed dimensions of the embedded member can easily be obtained.

Advantageous Effect

According to the present disclosure, a method for manufacturing a foam molded body in order to easily obtain a foam molded body in which a portion of an embedded member is exposed from the foam body can be provided.

BRIEF DESCRIPTION OF THE DRAWINGS

In the accompanying drawings:

FIG. 1 is a cross-sectional view schematically illustrating an example of a molding system that can be used in a method for manufacturing a foam molded body according to an embodiment of the present disclosure;

DETAILED DESCRIPTION

A method for manufacturing a foam molded body according to an embodiment of the present disclosure is described below with reference to the drawings.

Figure 1:
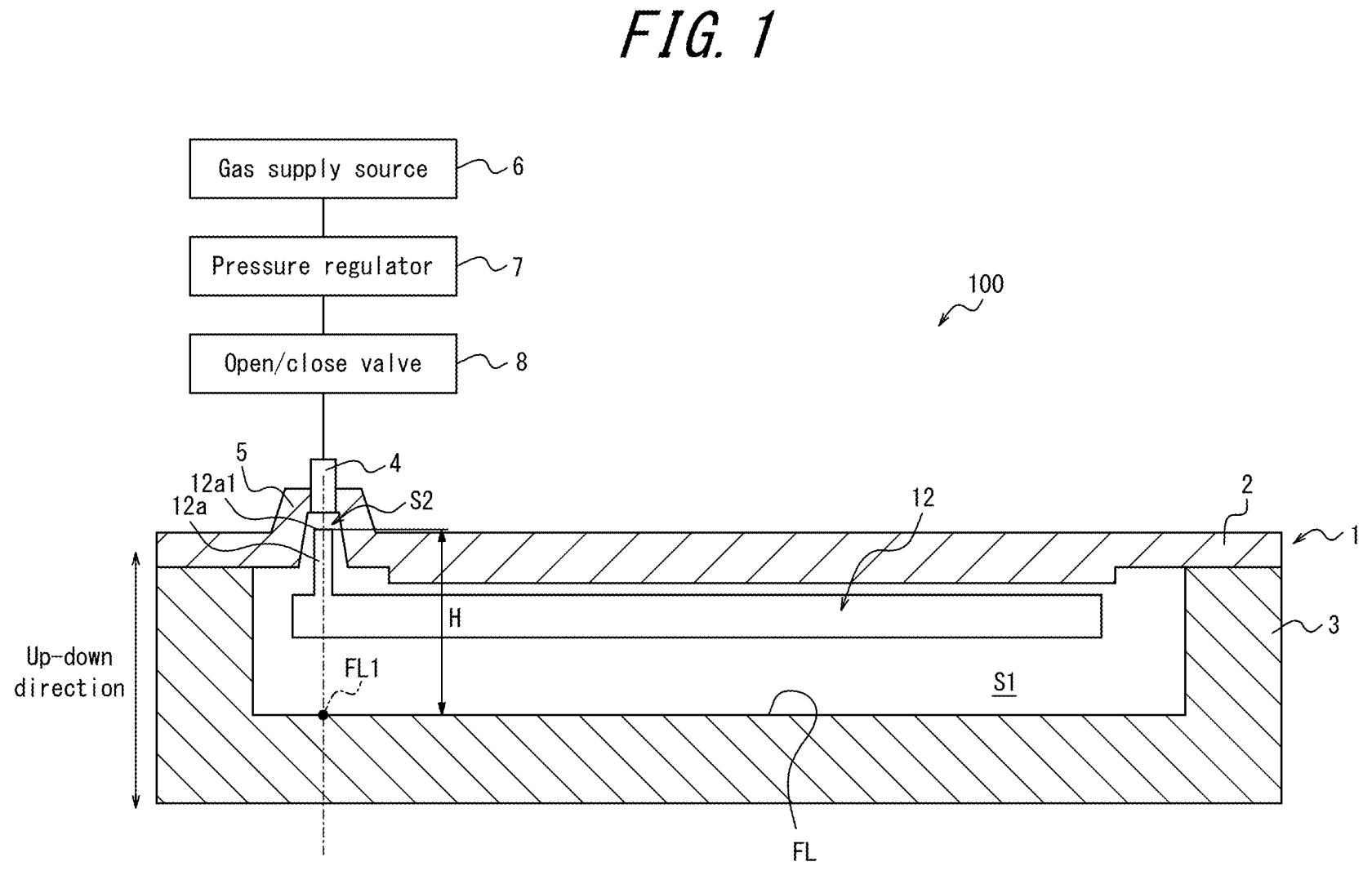

In FIG. 1, a molding system 100 that can be used in a method for manufacturing a foam molded body according to an embodiment of the present disclosure is schematically illustrated. The molding system 100 has a mold 1, as illustrated in FIG. 1.

A method for manufacturing a foam molded body of the present disclosure is a method for manufacturing a foam molded body to obtain a foam molded body in which a portion of an embedded member is exposed from a foam body by use of the mold 1 in FIG. 1.

Figure 2:
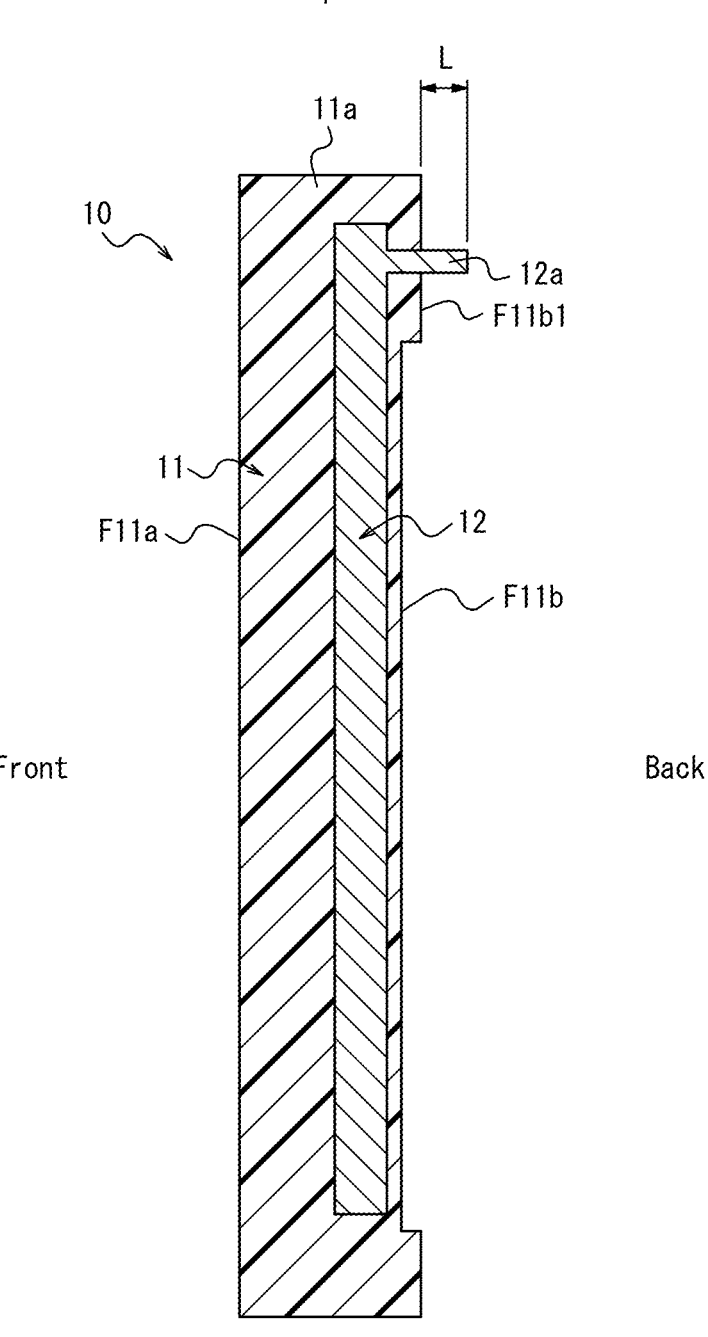
FIG. 2 is a cross-sectional view schematically illustrating a foam molded body that can be formed by using the molding system in FIG. 1.

In FIG. 2, a foam molded body 10 that can be molded by using the molding system 100 is schematically illustrated. As illustrated in FIG. 2, a portion 12a of an embedded member 12 is exposed from a foam body 11 in the foam molded body 10.

The foam molded body 10 obtained by the method for manufacturing a foam molded body of the present disclosure is, for example, a pad for a vehicle seat. In the present disclosure, the foam molded body 10 is a back pad used in an automobile. The foam molded body 10 is not, however, limited to back pads for automobiles. For example, the foam molded body 10 can be a seat pad for an automobile seat. The foam molded body 10 is not limited to use for automobile seats and can be applied to vehicles other than automobiles. Furthermore, the foam molded body 10 can be applied to pads for seats other than vehicles.

In the present disclosure, a front surface F11a of a foam body 11 serves as a backrest surface against which the back of an occupant rests. Also, in the present disclosure, a rear surface F11b of the foam body 11 serves as a mounting surface to be attached to a seat frame of a vehicle.

The foam body 11 is formed by foaming a foam raw material. The foam raw material is, for example, polyurethane. In the present disclosure, the foam body 11 is formed by polyurethane foam. Polyurethane foam includes, for example, rigid polyurethane foam, semi-rigid polyurethane foam, and soft polyurethane foam.

The embedded member 12 is embedded in the foam body 11. In the present disclosure, the embedded member 12 is a frame member that serves as the basic structure of the foam molded body 10. In the present disclosure, a portion 12a of the embedded member 12 protrudes to the rear from the rear surface F11b1 of an upper portion 11a in the foam body 11. In the present disclosure, the embedded member 12 is formed of a material having higher strength than the foam body 11, such as a metal or a resin (for example, an engineering plastic).

The method for manufacturing a foam molded body of the present disclosure uses mold forming, in which a foam raw material M is foamed inside a cavity S1 of the mold 1 in FIG. 1 to form the foam body 11. In the present disclosure, the mold forming is a molding method for using the mold 1 to obtain the foam molded body 10 in which the portion 12a of the embedded member 12 is exposed from the foam body 11 by placing the embedded member 12 in the cavity S1 formed inside the mold 1 and foaming the foam raw material M in the cavity S1. Specifically, the method for manufacturing a foam molded body of the present disclosure includes at least the following two processes.

(Foam Raw Material Foaming Process)

The foam raw material foaming process corresponds to a first process of the method for manufacturing a foam molded body of the present disclosure. In the foam raw material foaming process, the embedded member 12 is placed in the cavity S1 formed inside the mold 1 so that the portion 12a of the embedded member 12 is at a higher position than a bottom surface FL of the cavity S1, and the foam raw material M is foamed in the cavity S1.

In the present disclosure, the mold 1 includes an upper mold piece 2 and a lower mold piece 3. The upper mold piece 2 and the lower mold piece 3 can be detached by being separated from each other in the up-down direction. The upper mold piece 2 and the lower mold piece 3 can also be brought together by being placed next to each other in the up-down direction. In the present disclosure, the cavity S1 is formed between the upper mold piece 2 and the lower mold piece 3 by bringing the upper mold piece 2 and the lower mold piece 3 together.

In the present disclosure, the embedded member 12 can, for example, be removably attached to a predetermined position on the lower surface of the upper mold piece 2 at a predetermined position by using existing means, as illustrated in FIG. 1. As a result, the embedded member 12 can be placed at a predetermined position in the cavity S1, as illustrated in FIG. 1, by bringing the upper mold piece 2 and the lower mold piece 3 together. That is, in the present disclosure, the embedded member 12 can be housed in the cavity S1 as an insert for mold forming. In the present disclosure, as illustrated in FIG. 1, when the upper mold piece 2 and the lower mold piece 3 are clamped together, the embedded member 12 is positioned in the cavity S1 so that a portion 12a thereof is at a higher position than the bottom mold piece surface (FL) of the lower mold piece 3.

In the present disclosure, the foam raw material M is foamed in the cavity S1 in which the embedded member 12 is placed. The foam raw material M can be injected onto the bottom surface FL of the cavity S1 by separating the upper mold piece 2 from the lower mold piece 3. As a specific example, before the upper mold piece 2 and the lower mold piece 3 are brought together, the foam raw material M in liquid form, which has not yet been foamed, is injected onto the bottom mold piece surface (bottom surface FL of the cavity S1) of the lower mold piece 3. After the foam raw material M is injected onto the lower mold piece 3, the upper mold piece 2 is brought together with the lower mold piece 3. That is, in the present disclosure, the mold clamping between the upper mold piece 2 and the lower mold piece 3 is performed after the foam raw material M is supplied to the lower mold piece 3.

(Gas Injection Process)

The gas injection process corresponds to a second process of the method for manufacturing a foam molded body of the present disclosure. In the gas injection process, a gas G is injected into a portion 12a of the embedded member 12 in the cavity S1.

In the present disclosure, the gas G is supplied to the interior of the mold 1 through a gas supplier 4. In the present disclosure, the mold 1 includes a clearance forming portion 5. The gas supplier 4 is connected to the clearance forming portion 5.

Figure 3:
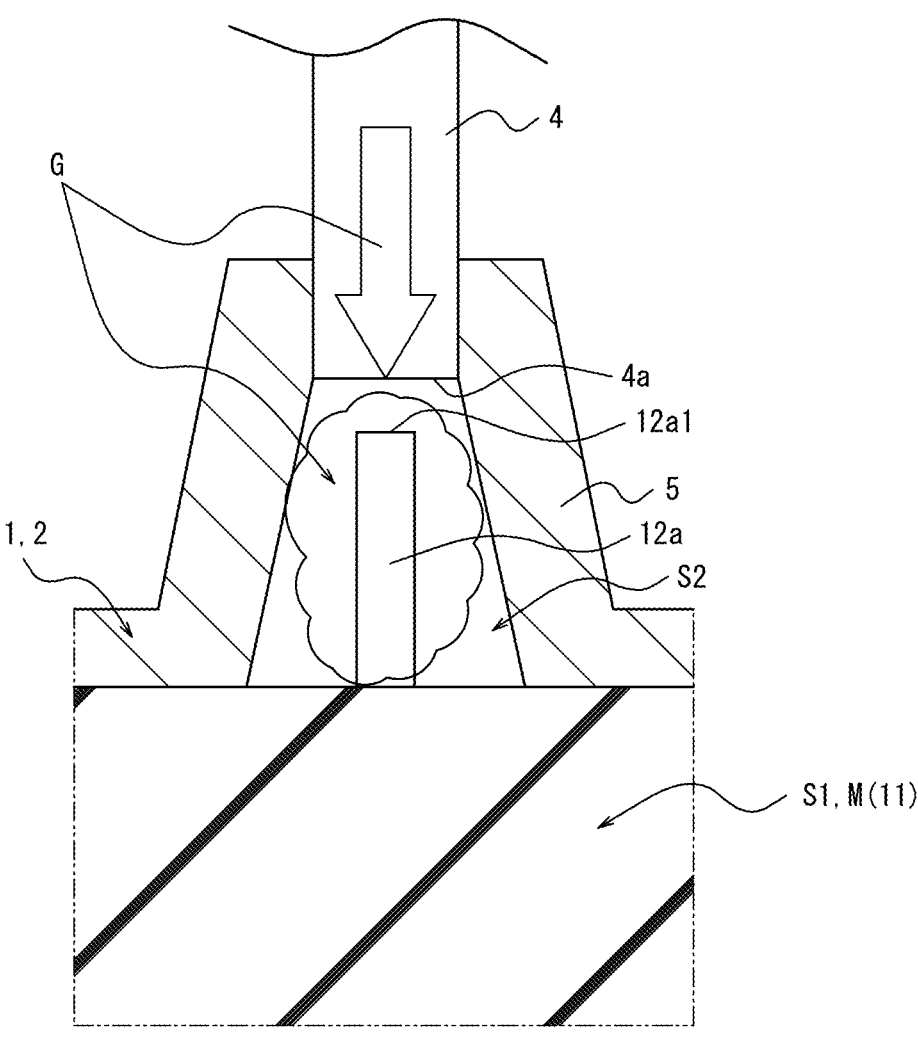
FIG. 3 is an enlarged cross-sectional view of a portion of the mold described in FIG. 1 to illustrate a method for manufacturing a foam molded body according to an embodiment of the present disclosure.

FIG. 3 illustrates an enlarged view of a portion of the mold 1.

The clearance forming portion 5 forms a clearance space S2 to prevent the foam raw material M from adhering to the portion 12a of the embedded member 12. The clearance space S2 is a space that connects to the cavity S1 forming the external shape of the foam body 11 and is filled with the gas G supplied through the gas supplier 4.

The clearance forming portion 5 is formed to surround the portion 12a of the embedded member 12. In the present disclosure, the clearance forming portion 5 is formed in the upper mold piece 2. In the present disclosure, the gas supplier 4 is arranged at a position such that a supply port 4a of the gas supplier 4 faces a tip 12a1 of the portion 12a of the embedded member 12. As a result, in the present disclosure, the gas G fills the clearance space S2 from the tip 12a1 of the portion 12a of the embedded member 12 along the direction of extension of the portion 12a of the embedded member 12. In this case, the foam raw material M can efficiently be prevented from adhering to the portion 12a of the embedded member 12.

In the present disclosure, the supply of the gas G starts at the point in time when the foam raw material M starts to react (to foam). As a specific example, the supply of the gas G can be started by treating the point in time when the upper mold piece 2 and the lower mold piece 3 are completely clamped together as the point in time when the foam raw material M starts to react. Alternatively, the supply of the gas G can be started by treating the time at which a predetermined time elapses from the point in time when the upper mold piece 2 and the lower mold piece 3 are completely clamped together as the point in time when the foam raw material M starts to react. Here, the predetermined time can be set in consideration of the time when the foam raw material M is expected to start foaming in the cavity S1.

Referring to FIG. 1, in the present disclosure, the gas G is supplied from a gas supply source 6. In the present disclosure, the gas supply source 6 is an air tank. That is, in the present disclosure, the gas G is air with which the air tank is filled. The gas G is not, however, limited to air. The gas G may be a gas that does not tend to react chemically with the foam raw material M, such as nitrogen gas.

An injection pressure P of the gas G is a pressure that is equivalent to a foaming pressure Pf of the foam raw material M.

Here, the "pressure equivalent to the foaming pressure Pf of the foam raw material M" includes both the same pressure as the foaming pressure Pf of the foam raw material M and the pressure allowable as the foaming pressure Pf of the foam raw material M. The foaming pressure Pf of the foam raw material M depends on the type of the foam raw material M.

Here, the pressure allowable as the foaming pressure Pf of the foam raw material M is the foaming pressure Pf of the foam raw material M±the allowable range pressure $\Delta P(\Delta P \neq Pf)$. That is, P can be expressed as a mathematical formula as follows.

$$Pf - \Delta P \le P \le Pf + \Delta P$$

In the present disclosure, the foaming pressure Pf of the foam raw material M is the foaming pressure Pf1 (MPa) of polyurethane. Also, in the present disclosure, the allowable range pressure $\Delta P$ is 0.03 (MPa).

The injection of the gas G is started at the point in time when the foam raw material M starts to react and is continued at least until a rise time TR of the foam raw material M elapses.

Here, the start of injection of the gas G is the point in time when the foam raw material M starts to react, as described above. The rise time TR refers to the time from when the foam raw material M starts foaming until the foam raw material M reaches its highest height (i.e., until foaming of the foam raw material M stops). The rise time TR depends on the type of foam raw material M.

In the present disclosure, the injection of the gas G is started when the unfoamed polyurethane in liquid form starts foaming and is continued at least until the rise time TR1 of the polyurethane elapses.

According to the method for manufacturing a foam molded body of the present disclosure, the gas G is supplied to the clearance space S2 of the mold 1 in accordance with the reaction of the foam raw material M, thereby suppressing growth of the foam raw material M in the clearance space S2. As illustrated in FIG. 3, this configuration allows the foam raw material M to adhere to most of the embedded member 12, while preventing the foam raw material M from adhering to the portion 12a of the embedded member 12.

Figure 4:
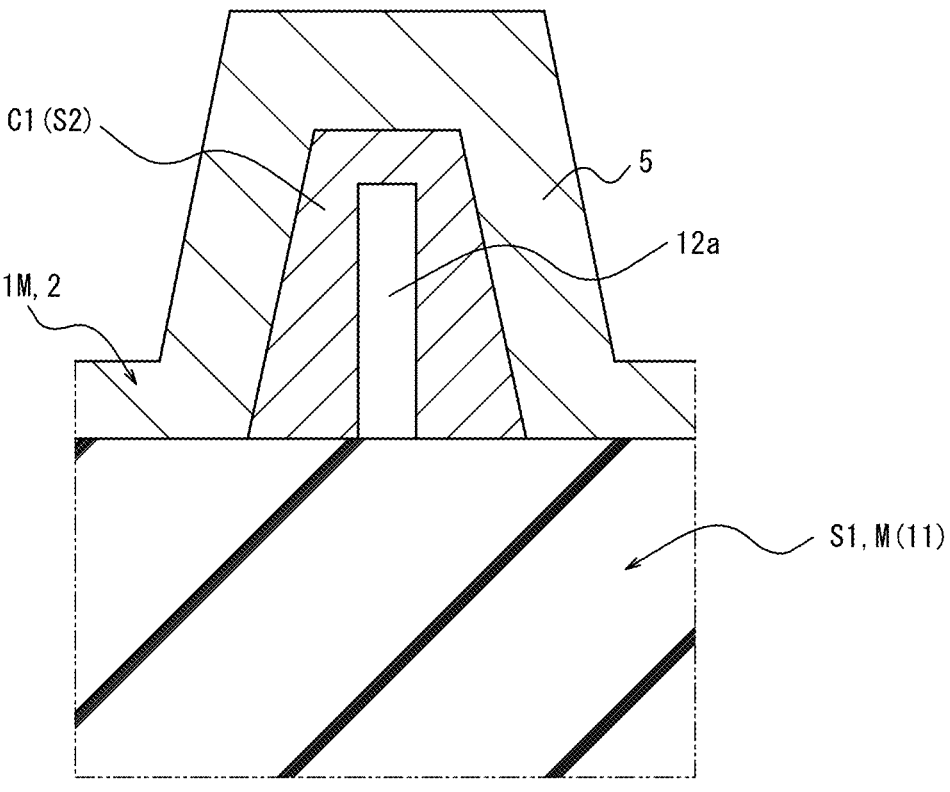
FIG. 4 is an enlarged cross-sectional view of a portion of a mold according to a Comparative Example, corresponding to a portion of the mold described in FIG. 1, to illustrate a method for manufacturing a foam molded body as a Comparative Example for comparison with the method for manufacturing a foam molded body according to an embodiment of the present disclosure.

FIG. 4 illustrates an enlarged view of a portion of a mold 1M according to a Comparative Example, corresponding to a portion of the mold 1 described in FIG. 1, for comparison with the method for manufacturing a foam molded body according to an embodiment of the present disclosure.

In this Comparative Example, it is necessary to use a clearance member C1 to fill the clearance space S2 during mold forming. Therefore, as illustrated in FIG. 4, the clearance member C1 is placed in the clearance space S2 to prevent the foam raw material M from adhering to the portion 12a of the embedded member 12. However, in the case of the Comparative Example, the clearance member C1 must be removed from the portion 12a of the embedded member 12 or the clearance space S2 after mold forming.

By contrast, the method for manufacturing a foam molded body according to the present disclosure can easily obtain the foam molded body 10 in which the portion 12a of the embedded member 12 is exposed from the foam body 11.

For example, according to the method for manufacturing a foam molded body of the present disclosure, adhesion of the foam raw material M to the portion 12a of the embedded member 12 can be prevented simply by injecting the gas G. In this case, there is no need to place the clearance member C1 inside the mold 1 as in the Comparative Example in FIG. 4. Manual work by an operator, which is performed in the Comparative Example in FIG. 4, thus becomes unnecessary, and the required number of man-hours can be reduced. Also, according to the method for manufacturing a foam molded body of the present disclosure, the foam material M does not flow between the mold 1 and the clearance member C1, since the clearance member C1 need not be placed inside the mold 1, as in the Comparative Example in FIG. 4. Therefore, according to the method for manufacturing a foam molded body of the present disclosure, the foam body 11 can be formed into the shape intended at the time of design. Additionally, according to the method for manufacturing a foam molded body of the present disclosure, there is no need to make the clearance member C1 a rotating mold, as described in PTL 1. According to the method for manufacturing a foam molded body of the present disclosure, periodic maintenance is therefore also unnecessary, since the foam raw material M does not penetrate into or adhere to the rotation mechanism of the rotating mold.

In the present disclosure, the injection time T of the gas G (injection duration of the gas G) is adjusted according to the height H between the portion 12a of the embedded member 12 and the bottom surface FL of the cavity S1. In the present disclosure, in a case in which two or more foam molded bodies 10 with different exposed dimensions L of the embedded member 12 are to be manufactured, the injection time T of the gas G is preferably longer for the foam molded body 10 for which the height H is higher than for the foam molded body 10 for which the height H is lower. In this case, foam molded bodies with different exposed dimensions of the embedded member 12 can easily be obtained.

Specific examples include the following cases.

Referring to FIG. 2, in the present disclosure, the portion 12a of the embedded member 12 in the foam molded body 10 protrudes (is exposed) from the rear surface F11b1 of the upper portion 11a in the foam body 11 by an exposed dimension L, as illustrated in FIG. 2.

In the method for manufacturing a foam molded body of the present disclosure, the exposed dimension L varies in accordance with the injection time T of the gas G. In a case in which two foam molded bodies 10 with different exposed dimensions L are to be manufactured using the method for manufacturing a foam molded body of the present disclosure, the injection time T of the gas G is longer when producing the foam molded body 10 with the longer exposed dimension L than when producing the foam molded body 10 with the shorter exposed dimension L. In this case, the injection time T of the gas G takes into account the growth of the foam raw material M during foaming. This configuration makes it easy to obtain foam molded bodies with different exposed dimensions of the embedded member 12 while using the same molding system 100, i.e., the same manufacturing method.

Here, the height H is the height from the direct bottom surface FL1 of the cavity S1, which is the portion of the bottom surface FL of the cavity S1 that is located directly below the portion 12a of the embedded member 12, as illustrated in FIG. 1. In the present disclosure, the height H is the height from the direct bottom surface FL1 of the cavity S1 to the tip 12a1 of the portion 12a of the embedded member 12.

As illustrated in FIG. 1, in the present disclosure, the molding system 100 includes a pressure regulator 7 and an open/close valve 8 in addition to the gas supply source 6.

In the present disclosure, the injection pressure P of the gas G can be adjusted by the pressure regulator 7, for example, which is located downstream from the gas supply source 6. In this case, the gas G can be injected into the clearance space S2 at the pressure adjusted by the pressure regulator 7. In the present disclosure, the open/close valve 8 is arranged between the pressure regulator 7 and the gas supplier 4. In this case, injection of the gas G and suspension of injection of the gas G can be controlled by opening and closing the open/close valve 8. The open/close valve 8 can be operated manually or automatically.

While exemplary embodiments of the present disclosure have been described above, various changes may be made without departing from the scope of the claims. For example, in the present disclosure, the portion 12a of the embedded member 12 is configured to extend in the up-down direction, but the direction in which the portion 12a of the embedded member 12 points is not limited to the up-down direction. Also, the embedded member 12 is not limited to a frame member. That is, the external shape of the embedded member 12 can be changed to various external shapes along with the external shape of the foam body 11.

8

REFERENCE SIGNS LIST

1 Mold
2 Upper mold piece
3 Lower mold piece
4 Gas supplier
5 Clearance forming portion
6 Gas supply source
7 Pressure regulator
8 Open/close valve
10 Foam molded body
11 Foam body
12 Embedded member
12a Portion of embedded member
100 Molding system
G Gas
H Height between portion of embedded member and bottom surface of cavity
M Foam raw material
S1 Cavity
FL Bottom surface of cavity
FL1 Direct bottom surface of cavity
S2 Clearance space
P Injection pressure of gas
Pf Foaming pressure of foam raw material
Pf1 Foaming pressure of polyurethane
ΔP Allowable range pressure
T Injection time of gas
TR Rise time of foam body
TR1 Rise time of polyurethane

The invention claimed is:

1. A method for manufacturing a foam molded body to obtain a foam molded body in which a portion of an embedded member is exposed from a foam body by use of a mold, the method comprising: a foam raw material foaming process of placing the embedded member in a cavity formed inside the mold so that the portion of the embedded member is at a higher position than a bottom surface of the cavity and foaming a foam raw material in the cavity; and a gas injection process of injecting a gas toward the portion of the embedded member in the cavity, wherein an injection pressure of the gas is a pressure that is equivalent to a foaming pressure of the foam raw material, the injecting of the gas is started at a point in time when the foam raw material starts to react and is continued at least until a rise time of the foam raw material elapses, and the gas is injected for an injection time adjusted according to a length of an exposed dimension of the portion of the embedded member.

\* \* \* \* \*